(12) United States Patent
Mittricker et al.

(10) Patent No.: US 10,570,793 B2
(45) Date of Patent: Feb. 25, 2020

(54) SYSTEMS AND METHODS FOR CARBON DIOXIDE CAPTURE AND POWER GENERATION IN LOW EMISSION TURBINE SYSTEMS

(71) Applicants: Franklin F. Mittricker, Jamul, CA (US); Sulabh K. Dhanuka, Houston, TX (US); Richard A. Huntington, Spring, TX (US); O. Angus Sites, Spring, TX (US); Dennis M. O'Dea, Somerset, NJ (US); Russell H. Oelfke, Houston, TX (US)

(72) Inventors: Franklin F. Mittricker, Jamul, CA (US); Sulabh K. Dhanuka, Houston, TX (US); Richard A. Huntington, Spring, TX (US); O. Angus Sites, Spring, TX (US); Dennis M. O'Dea, Somerset, NJ (US); Russell H. Oelfke, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 218 days.

(21) Appl. No.: 15/351,918

(22) Filed: Nov. 15, 2016

(65) Prior Publication Data

US 2017/0058737 A1     Mar. 2, 2017

Related U.S. Application Data

(62) Division of application No. 14/002,625, filed as application No. PCT/US2012/027774 on Mar. 5, 2012, now abandoned.

(Continued)

(51) Int. Cl.
    *F02C 3/34*      (2006.01)
    *F01N 3/08*      (2006.01)
    (Continued)

(52) U.S. Cl.
    CPC .......... *F01N 3/0857* (2013.01); *B01D 53/62* (2013.01); *F01N 5/02* (2013.01); *F02C 3/20* (2013.01);
    (Continued)

(58) Field of Classification Search
    CPC .......... F05D 2260/61; F05D 2260/611; B01D 53/1475; B01D 53/62; Y02C 10/04–10;
    (Continued)

(56) References Cited

U.S. PATENT DOCUMENTS

| 6,622,470 B2 * | 9/2003 | Viteri | F01K 21/047 |
| | | | 60/39.52 |
| 6,877,322 B2 | 4/2005 | Fan | 60/781 |

(Continued)

FOREIGN PATENT DOCUMENTS

| CN | 101787930 | 7/2010 |
| JP | 11-264325 | 9/1999 |

*Primary Examiner* — Arun Goyal
(74) *Attorney, Agent, or Firm* — ExxonMobil Upstream Research Company—Law Department

(57) ABSTRACT

Systems, methods, and apparatus are provided for generating power in low emission turbine systems and separating the exhaust into rich $CO_2$ and lean $CO_2$ streams. In one or more embodiments, the exhaust is separated at an elevated pressure, such as between a high-pressure expansion stage and a low-pressure expansion stage.

25 Claims, 4 Drawing Sheets

Related U.S. Application Data

(60) Provisional application No. 61/542,036, filed on Sep. 30, 2011, provisional application No. 61/466,384, filed on Mar. 22, 2011, provisional application No. 61/542,030, filed on Sep. 30, 2011, provisional application No. 61/466,385, filed on Mar. 22, 2011, provisional application No. 61/542,031, filed on Sep. 30, 2011, provisional application No. 61/466,381, filed on Mar. 22, 2011, provisional application No. 61/542,035, filed on Sep. 30, 2011.

(51) Int. Cl.

| | | |
|---|---|---|
| *F02C 3/22* | (2006.01) | |
| *F02C 3/24* | (2006.01) | |
| *F02C 3/20* | (2006.01) | |
| *B01D 53/62* | (2006.01) | |
| *F02C 7/00* | (2006.01) | |
| *F01N 5/02* | (2006.01) | |
| *H02K 7/18* | (2006.01) | |
| *F02C 3/04* | (2006.01) | |

(52) U.S. Cl.
CPC .............. *F02C 3/22* (2013.01); *F02C 3/24* (2013.01); *F02C 3/34* (2013.01); *F02C 7/00* (2013.01); *H02K 7/1823* (2013.01); *F02C 3/04* (2013.01); *F05D 2260/61* (2013.01); *Y02A 50/2342* (2018.01); *Y02C 10/04* (2013.01); *Y02E 20/16* (2013.01)

(58) Field of Classification Search
CPC ...... F02C 3/02; F02C 3/04; F02C 3/20; F02C 3/22; F02C 3/24; F02C 3/34; F02C 6/18; F02C 7/00
See application file for complete search history.

(56) References Cited

U.S. PATENT DOCUMENTS

| | | |
|---|---|---|
| 7,266,940 B2 | 9/2007 | Balan et al. |
| 7,634,915 B2 * | 12/2009 | Hoffmann ................ C01B 3/38 60/39.12 |
| 7,739,864 B2 * | 6/2010 | Finkenrath ............. F01K 23/10 60/39.17 |
| 7,895,872 B2 | 3/2011 | Hoffmann et al. |
| 8,663,363 B2 | 3/2014 | Iijima et al. |
| 8,734,545 B2 | 5/2014 | Hershkowitz et al. |
| 2011/0000671 A1 * | 1/2011 | Hershkowitz ............ C01B 3/38 166/305.1 |

* cited by examiner

SYSTEMS AND METHODS FOR CARBON DIOXIDE CAPTURE AND POWER GENERATION IN LOW EMISSION TURBINE SYSTEMS

CROSS REFERENCE TO RELATED APPLICATIONS

This application is a divisional of U.S. patent application Ser. No. 14/002,625 filed Aug. 30, 2013 that published as U.S. Patent Publication No. 2014/0013766, which claims priority to U.S. Provisional Application 61/542,036 filed Sep. 30, 2011 entitled, SYSTEMS AND METHODS FOR CARBON DIOXIDE CAPTURE IN LOW EMISSION TURBINE SYSTEMS; U.S. Provisional Application 61/466,384 filed Mar. 22, 2011 entitled, LOW EMISSION TURBINE SYSTEMS HAVING A MAIN AIR COMPRESSOR OXIDANT CONTROL APPARATUS AND METHODS RELATED THERETO; U.S. Provisional Application 61/542,030 filed Sep. 30, 2011 entitled, LOW EMISSION TURBINE SYSTEMS INCORPORATING INLET COMPRESSOR OXIDANT CONTROL APPARATUS AND METHODS RELATED THERETO; U.S. Provisional Application 61/466,385 filed Mar. 22, 2011 entitled, METHODS FOR CONTROLLING STOICHIOMETRIC COMBUSTION ON A FIXED GEOMETRY GAS TURBINE SYSTEM AND APPARATUS AND SYSTEMS RELATED THERETO; U.S. Provisional Application 61/542,031 filed Sep. 30, 2011 entitled, SYSTEMS AND METHODS FOR CONTROLLING STOICHIOMETRIC COMBUSTION IN LOW EMISSION TURBINE SYSTEMS; U.S. Provisional Application 61/466,381 filed Mar. 22, 2011 entitled, METHODS OF VARYING LOW EMISSION TURBINE GAS RECYCLE CIRCUITS AND SYSTEMS AND APPARATUS RELATED THERETO; U.S. Provisional Application 61/542,035 filed Sep. 30, 2011 entitled, METHODS OF VARYING LOW EMISSION TURBINE GAS RECYCLE CIRCUITS AND SYSTEMS AND APPARATUS RELATED THERETO; all of which are hereby incorporated by reference in their entirety.

This application is related to U.S. Provisional Application 61/542,037 filed Sep. 30, 2011 entitled, SYSTEMS AND METHODS FOR CARBON DIOXIDE CAPTURE IN LOW EMISSION TURBINE SYSTEMS; U.S. Provisional Application 61/542,039 filed Sep. 30, 2011 entitled, SYSTEMS AND METHODS FOR CARBON DIOXIDE CAPTURE IN LOW EMISSION COMBINED TURBINE SYSTEMS; U.S. Provisional Application 61/542,041 filed Sep. 30, 2011 entitled, LOW EMISSION POWER GENERATION SYSTEMS AND METHODS INCORPORATING CARBON DIOXIDE SEPARATION; all of which are hereby incorporated by reference in their entirety.

FIELD OF THE DISCLOSURE

Embodiments of the disclosure relate to low emission power generation. More particularly, embodiments of the disclosure relate to methods and apparatus for carbon dioxide separation and capture for power generation in low emission turbine systems.

BACKGROUND OF THE DISCLOSURE

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Many oil producing countries are experiencing strong domestic growth in power demand and have an interest in enhanced oil recovery (EOR) to improve oil recovery from their reservoirs. Two common EOR techniques include nitrogen ($N_2$) injection for reservoir pressure maintenance and carbon dioxide ($CO_2$) injection for miscible flooding for EOR. There is also a global concern regarding green house gas (GHG) emissions. This concern combined with the implementation of cap-and-trade policies in many countries makes reducing $CO_2$ emissions a priority for those countries as well as for the companies that operate hydrocarbon production systems therein.

Some approaches to lower $CO_2$ emissions include fuel de-carbonization or post-combustion capture using solvents, such as amines. However, both of these solutions are expensive and reduce power generation efficiency, resulting in lower power production, increased fuel demand and increased cost of electricity to meet domestic power demand. In particular, the presence of oxygen, $SO_x$, and $NO_x$ components makes the use of amine solvent absorption very problematic. Another approach is an oxyfuel gas turbine in a combined cycle (e.g., where exhaust heat from the gas turbine Brayton cycle is captured to make steam and produce additional power in a Rankin cycle). However, there are no commercially available gas turbines that can operate in such a cycle and the power required to produce high purity oxygen significantly reduces the overall efficiency of the process.

Moreover, with the growing concern about global climate change and the impact of carbon dioxide emissions, emphasis has been placed on minimizing carbon dioxide emissions from power plants. Gas turbine power plants are efficient and can have a lower cost compared to nuclear or coal power generation technologies. Capturing carbon dioxide from the exhaust of a gas turbine power plant is expensive for the following reasons: (a) the concentration of carbon dioxide in the exhaust stack is low, (b) the volume of gas that needs to be treated is large, (c) the pressure of the exhaust stream is low, and (d) the amount of oxygen present in the exhaust stream is large. All of these factors result in a high cost of carbon dioxide capture.

Accordingly, there is still a substantial need for a low emission, high efficiency power generation and $CO_2$ capture process.

SUMMARY OF THE DISCLOSURE

In the low emission power generation systems described herein, exhaust gases from low emission gas turbines, which are vented in a typical natural gas combined cycle (NGCC) plant, are instead separated and recovered. The apparatus, systems, and methods of the invention combine an open Brayton cycle that uses an oxidant and hydrocarbon fuel to generate power with a carbon dioxide separation process. The carbon dioxide separation process takes place at a pressure between the compressor outlet pressure and the final expander outlet pressure and results in two exhaust streams, one carbon dioxide ($CO_2$) rich and the other $CO_2$ lean. The rich $CO_2$ and lean $CO_2$ streams may be used for the same or different purposes. Uses for each stream include injection into hydrocarbon reservoirs for enhanced oil recovery, generation of additional power, carbon sequestration or storage, for recycle to the combustion chamber of the turbine to cool the products of combustion down to the material limitations in the expander, for sale, or for venting.

In the systems and methods of the present invention, high pressure exhaust gases exiting the combustion chamber of a low emission gas turbine are partially expanded in a first high-pressure expander, generating power. The exhaust gases exit the first expander at elevated pressure and are separated into rich $CO_2$ and lean $CO_2$ streams using a $CO_2$ separation process. Pressure is maintained on the lean $CO_2$ stream during the separation process, which allows further energy extraction from the lean $CO_2$ stream in a second low-pressure expander. By operating the separation process between the two expansion stages at an elevated pressure, the separation equipment may be downsized and the effectiveness of the separation process may be improved.

BRIEF DESCRIPTION OF THE DRAWINGS

The foregoing and other advantages of the present disclosure may become apparent upon reviewing the following detailed description and drawings of non-limiting examples of embodiments in which.

DETAILED DESCRIPTION

Figure 1:
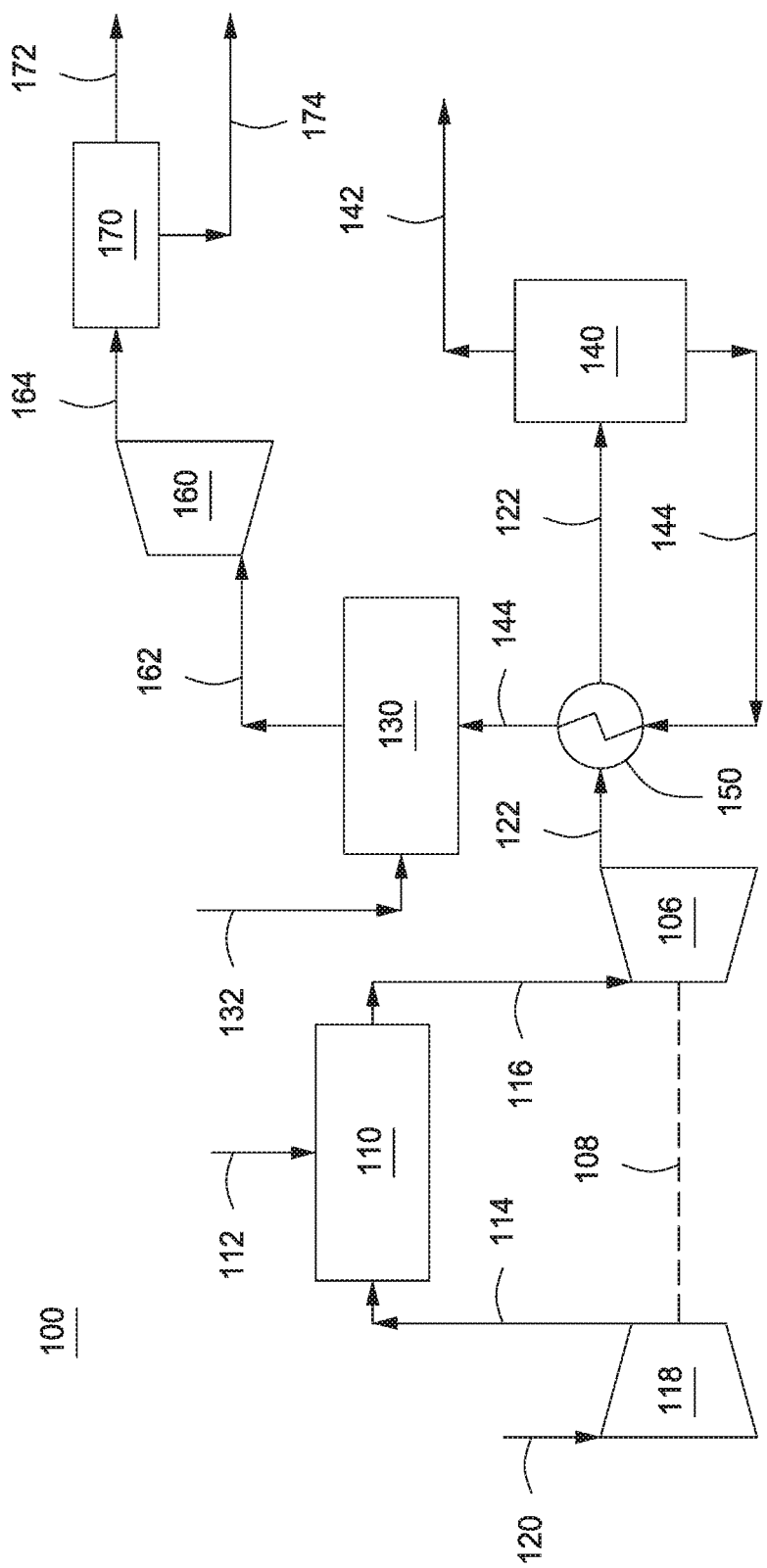
FIG. 1 depicts a low emission power generation system incorporating $CO_2$ separation between two expansion stages.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

As used herein, the term "natural gas" refers to a multi-component gas obtained from a crude oil well (associated gas) and/or from a subterranean gas-bearing formation (non-associated gas). The composition and pressure of natural gas can vary significantly. A typical natural gas stream contains methane ($CH_4$) as a major component, i.e. greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., hydrogen sulfide), or any combination thereof. The natural gas can also contain minor amounts of contaminants such as water, nitrogen, iron sulfide, wax, crude oil, or any combination thereof.

As used herein, the term "stoichiometric combustion" refers to a combustion reaction having a volume of reactants comprising a fuel and an oxidizer and a volume of products formed by combusting the reactants where the entire volume of the reactants is used to form the products. As used herein, the term "substantially stoichiometric" combustion refers to a combustion reaction having an equivalence ratio ranging from about 0.9:1 to about 1.1:1, or more preferably from about 0.95:1 to about 1.05:1. Use of the term "stoichiometric" herein is meant to encompass both stoichiometric and substantially stoichiometric conditions unless otherwise indicated.

As used herein, the term "stream" refers to a volume of fluids, although use of the term stream typically means a moving volume of fluids (e.g., having a velocity or mass flow rate). The term "stream," however, does not require a velocity, mass flow rate, or a particular type of conduit for enclosing the stream.

Embodiments of the presently disclosed systems and processes may be used to produce ultra low emission electric power and $CO_2$ for enhanced oil recovery (EOR) or sequestration applications. In EOR applications, $CO_2$ is injected into or adjacent to producing oil wells, usually under supercritical conditions. The $CO_2$ acts as both a pressurizing agent and, when dissolved into the underground crude oil, significantly reduces the oil's viscosity enabling the oil to flow more rapidly through the earth to a removal well. According to embodiments disclosed herein, a mixture of compressed oxidant (typically air) and fuel is combusted and the exhaust gas is expanded in a first expansion stage to generate power. The exhaust gas is then separated into rich $CO_2$ and lean $CO_2$ streams at elevated pressure. The lean $CO_2$ stream may then be expanded again in a second expansion stage to generate additional power. The rich $CO_2$ stream may, in some embodiments, be recycled and mixed with the oxidant entering the combustion chamber to act as a diluent to control or otherwise moderate the temperature of the combustion and exhaust gas entering the succeeding expander. The combustion may be stoichiometric or non-stoichiometric.

Combustion at near stoichiometric conditions (or "slightly rich" combustion) can prove advantageous in order to eliminate the cost of excess oxygen removal. By cooling the exhaust gas and condensing the water out of the stream, a relatively high content $CO_2$ stream can be produced. While a portion of the recycled exhaust gas can be utilized for temperature moderation in a closed Brayton cycle, the remaining portion can be used for EOR applications and electric power can be produced with little or no $SO_x$, $NO_x$, or $CO_2$ being emitted to the atmosphere. For example, the non-recycled stream can be processed to generate a lean $CO_2$ stream which can be subsequently expanded in a gas expander to generate additional mechanical power. The result of the systems disclosed herein is the production of power and the production or capture of additional $CO_2$ at a more economically efficient level.

The present invention is directed to systems and methods for low emission power generation comprising a separation process in which exhaust gas from a combustion chamber is separated into rich $CO_2$ and lean $CO_2$ streams at an elevated pressure. In some embodiments, one or both of the rich $CO_2$ and lean $CO_2$ streams may be injected into one or more hydrocarbon reservoirs for enhanced oil recovery (EOR). As used herein, the terms "rich" and "lean" mean that, of the total amount of $CO_2$ entering the $CO_2$ separation process at least about 51% of that $CO_2$ exits the separation process via the rich $CO_2$ stream, with the remaining $CO_2$ exiting in the lean $CO_2$ stream. In some embodiments, at least about 55%, or at least about 60%, or at least about 65%, or at least about 70%, or at least about 75%, or at least about 80%, or at least about 85%, or at least about 90%, or at least about 95% of the total $CO_2$ entering the separation process exits in the rich $CO_2$ stream.

In the systems and methods herein, one or more oxidants are compressed and combusted with one or more fuels in a combustion chamber. The oxidant may comprise any oxygen-containing fluid, such as ambient air, oxygen-enriched air, substantially pure oxygen, or combinations thereof. The one or more oxidants may be compressed in one or more compressors. Each compressor may comprise a single stage or multiple stages. In multiple stage compressors, interstage cooling may optionally be employed to allow for higher overall compression ratios and higher overall power output. Each compressor may be of any type suitable for the process described herein, and is preferably reliable, efficient, and capable of a high compression ratio. Such compressors include, but are not limited to, axial, centrifugal, reciprocating, or twin-screw compressors and combinations thereof. In one or more embodiments, the oxidant compressor or compressors are axial compressors. The fuel may comprise natural gas, associated gas, diesel, fuel oil, gasified coal, coke, naphtha, butane, propane, ethane, methane, syngas, kerosene, aviation fuel, bio-fuel, oxygenated hydrocarbon feedstock, bitumen, any other suitable hydrocarbon containing gases or liquids, hydrogen, or combinations thereof. Additionally, the fuel may comprise inert components including but not limited to $N_2$ or $CO_2$. In some embodiments, the fuel may be at least partially supplied by a hydrocarbon reservoir that is benefitting from enhanced oil recovery via injection of either the rich $CO_2$ stream or the lean $CO_2$ stream or both. The combustion conditions in the combustion chamber may be lean, stoichiometric or substantially stoichiometric, or rich. In one or more embodiments, the combustion conditions are stoichiometric or substantially stoichiometric. Combustion of the fuel and oxidant can typically generate temperatures between about 2000° F. and 3000° F. In some embodiments, the combustion chamber operates at a pressure at or near the output pressure of the oxidant compressor.

Combustion of the oxidant and fuel in the combustion chamber generates an exhaust stream, which is then expanded. The exhaust stream comprises products of combustion, and its composition will vary depending upon the composition of the fuel and the oxidant used. In one or more embodiments, the discharge exhaust stream from the combustion chamber may comprise vaporized water, $CO_2$, carbon monoxide (CO), oxygen, nitrogen, argon, nitrogen oxides ($NO_x$), sulfur oxides ($SO_x$), hydrogen sulfide ($H_2S$), hydrocarbons, or combinations thereof. The discharge exhaust stream may be expanded in one or more expanders. The discharge exhaust stream entering the expander (or expander system, if more than one expander is used) is typically at a temperature and pressure approximately the same as the exit temperature and pressure of the combustion chamber.

Each of the one or more expanders may comprise a single stage or multiple stages. Each expander may be any type of expander suitable for the process described herein, including but not limited to axial or centrifugal expanders or combinations thereof. Each expander is preferably efficient and capable of high expansion ratios. Expansion of the exhaust stream generates power, which may be used to drive one or more compressors or electric generators. In one or more embodiments of the invention, the expander is coupled to the oxidant compressor via a common shaft or other mechanical, electrical, or other power coupling, such that the oxidant compressor is at least partially driven by the expander. In other embodiments, the oxidant compressor may be mechanically coupled to an electric motor with or without a speed increasing or decreasing device such as a gear box or to a steam turbine. When taken together, the oxidant compressor, combustion chamber, and expander may be characterized as an open Brayton cycle.

In one or more embodiments of the invention, at least two expander stages are employed, with a $CO_2$ separation process incorporated between any two of the stages. The first stage is a high pressure expander that accepts the discharge exhaust gas from the combustion chamber and outputs the same gases to a $CO_2$ separation process at a reduced temperature and pressure. While reduced, the pressure at the outlet of the high pressure expander is still higher than ambient conditions. For example, the outlet pressure of the high pressure expander may be greater than about 25 psia, or greater than about 50 psia, or greater than about 75 psia, or greater than about 100 psia.

The $CO_2$ separation process may be any suitable process designed to separate the pressurized exhaust gases into a rich $CO_2$ stream and a lean $CO_2$ stream. Separating the components of the exhaust gas allows different components in the exhaust to be handled in different ways. Ideally, the separation process would segregate all of the greenhouse gases in the exhaust, such as $CO_2$, CO, $NO_x$, $SO_x$, etc. in the rich $CO_2$ stream, leaving the remainder of the exhaust components such as nitrogen, oxygen, argon, etc. in the lean $CO_2$ stream. In practice, however, the separation process may not withdraw all of the greenhouse gases from the lean stream, and some non-greenhouse gases may remain in the rich stream. Any suitable separation process designed to achieve the desired result may be used. Examples of suitable separation processes include, but are not limited to, hot potassium carbonate ("hot pot") separation processes, amine separation, molecular sieve separation, membrane separation, adsorptive kinetic separation, controlled freeze zone separation, and combinations thereof. In some embodiments, a hot pot separation process is used for $CO_2$ separation. In one or more embodiments of the invention, the separation process operates at elevated pressure (i.e., higher than ambient and approximately the same as the outlet pressure of the high-pressure expander) and is configured to keep the lean $CO_2$ stream pressurized. Maintaining pressure on the lean $CO_2$ stream in this manner allows for smaller separation equipment, provides for improved separation effectiveness, and allows further energy extraction from the lean $CO_2$ stream. In some embodiments, the $CO_2$ separation process is selected and configured to maximize either the outlet pressure or the outlet temperature, or both, of the lean $CO_2$ stream. While the term "$CO_2$ separator" is used herein for simplicity in illustrating or describing certain embodiments of the invention, it should be appreciated that the term is meant to encompass the entire $CO_2$ separation process and does not necessarily refer to a single apparatus or process step.

In one or more embodiments, the lean $CO_2$ stream exits the $CO_2$ separator at an elevated pressure and is directed to a second expansion stage, which may be a low pressure expander configured to receive the pressurized lean $CO_2$ stream and output the same gases at approximately ambient pressure. As will be appreciated by those skilled in the art, each expansion stage generates power, and the power generated by each expander may be used to at least partially drive one or more compressors or electric generators in any configuration, either within the described system or externally. Conveniently, in one or more embodiments, the first (high pressure) expander may at least partially drive a first oxidant compressor. In such embodiments, the first compressor, combustor, and first expander may be a packaged gas turbine. In the same or other embodiments, a second oxidant compressor may be employed to provide further compression of the oxidant feed to the combustor either before or after the first compressor, and the second (low pressure) expander may at least partially drive the second oxidant compressor. In such embodiments, the first and second compressors, combustor, and first and second expanders may be a packaged gas turbine. Alternatively, one expander may be used to drive the oxidant compressor, while another expander may be used to drive a pipeline or injection compressor to compress the rich $CO_2$ stream (or the lean $CO_2$ stream) for injection into a reservoir for storage or EOR. In such configurations, the pipeline or injection compressor may be located in the vicinity of the power generation systems described herein.

Although the $CO_2$ separation process as described herein is preferably located between expansion stages, the separation may alternatively take place prior to the first expansion stage. In such configurations, the exhaust gas from the combustion chamber is provided directly to the separator and the separator produces a rich $CO_2$ stream and a lean $CO_2$ stream as described above. The lean $CO_2$ stream is then directed to one or more expanders or expansion stages, and the rich $CO_2$ stream may also be expanded or may be treated in a variety of ways described in more detail below.

In one or more embodiments, the lean $CO_2$ stream may optionally be heated prior to the low pressure expansion stage. Such heating may be accomplished using any suitable heating device. For example, one or more heat exchangers or cross exchangers may be configured to transfer heat to the lean $CO_2$ stream before the lean $CO_2$ stream enters the low pressure expander. The one or more heat or cross exchangers may be configured to transfer heat from a variety of sources, such as from the discharge of the first combustor or from the discharge of the high pressure expander. In the same or other embodiments, the lean $CO_2$ stream may be heated in a second combustion chamber located between the high pressure and low pressure expansion stages. Use of a second combustion chamber requires the supply of additional fuel, which may be the same as or different from the fuel supplied to the first combustion chamber. In some embodiments, the fuel supplied to and combusted in the second combustion chamber comprises hydrogen. The oxidant required by the second combustion chamber may be supplied via a separate oxidant stream, or there may be sufficient oxidant in the lean $CO_2$ stream such that an additional supply of oxidant is unnecessary. By heating the lean $CO_2$ stream before the low pressure expansion stage of the process, power generation in the low pressure expander may be increased.

In one or more embodiments, either the lean $CO_2$ stream (after expansion) or the rich $CO_2$ stream, or both, may pass through one or more heat recovery steam generators (HRSGs). The one or more HRSGs may be configured to utilize the residual heat in one or both of the streams to generate steam. The steam generated by the one or more HRSGs may be used for a variety of purposes, such as to drive a steam turbine generator in a Rankine cycle, to drive a steam turbine in mechanical drive service, or for water desalination. Where the lean $CO_2$ stream and the rich $CO_2$ stream are each directed to a HRSG, the steam generated by each HRSG may be used for the same or different applications. Further, if any residual heat remains in either or both of the lean or rich $CO_2$ streams exiting the one or more HRSGs, the system may further comprise one or more heat exchangers configured to transfer that heat to a non-steam working fluid. In such embodiments, the non-steam working fluid may optionally be used to drive an expander in a Rankine cycle.

Each of the rich $CO_2$ stream and the lean $CO_2$ streams may be used, wholly or in part, for a variety of applications, and the two streams may be used for the same or different applications. For example, at least a portion of the rich $CO_2$ stream may be recycled and mixed with the oxidant entering the combustion chamber or added directly to the combustion chamber to act as a diluent to control or otherwise moderate the temperature of the combustion and exhaust gas entering the succeeding expander. In such instances, the system may be characterized as comprising a closed Brayton cycle. In the same or other embodiments, the rich $CO_2$ stream may be injected into a hydrocarbon reservoir for enhanced oil recovery (EOR), may be directed to a reservoir for carbon sequestration or storage. The rich $CO_2$ stream may also be sold, vented, or flared. In one or more embodiments, the lean $CO_2$ stream may also be used for EOR. In the same or other embodiments, the lean $CO_2$ stream may be sold, vented, or flared.

The invention may comprise further elements in addition to the low emission power generation systems and methods described herein. For example, in some embodiments the systems may further comprise one or more hydrocarbon reservoirs, injection wells, and/or compression and pipeline systems configured to increase the pressure of the rich $CO_2$ stream and transport the stream for injection into the hydrocarbon reservoir. In the same or other embodiments, the systems may further comprise a pipeline system to convey gas from a hydrocarbon reservoir to the power generation system for fuel. In the same or other embodiments, the systems may further comprise an electrical system configured to convey electricity from an electric generator to at least partially power one or more compressors within the system or to at least partially power a pipeline system.

Referring now to the figures, FIG. 1 illustrates a power generation system 100 configured to provide separation and capture of $CO_2$ after combustion. In at least one embodiment, the power generation system 100 can have a first compressor 118 coupled to a first expander 106 through a common shaft 108 or other mechanical, electrical, or other power coupling, thereby allowing a portion of the mechanical energy generated by the first expander 106 to drive the first compressor 118. The first expander 106 may generate power for other uses as well, such as to power another compressor, an electric generator, or the like. The first compressor 118 and first expander 106 may form the compressor and expander ends, respectively, of a standard gas turbine. In other embodiments, however, the first compressor 118 and first expander 106 can be individualized components in a system.

The system 100 can also include a first combustion chamber 110 configured to combust a first fuel stream 112 mixed with a compressed oxidant 114. In one or more embodiments, the first fuel stream 112 can include any suitable hydrocarbon gas or liquid, such as natural gas, methane, ethane, naphtha, butane, propane, syngas, diesel, kerosene, aviation fuel, coal derived fuel, bio-fuel, bitumen, oxygenated hydrocarbon feedstock, or combinations thereof. The first fuel stream 112 may also comprise hydrogen. The compressed oxidant 114 can be derived from the first compressor 118 fluidly coupled to the first combustion chamber 110 and adapted to compress a feed oxidant 120. While the discussion herein assumes that the feed oxidant 120 is ambient air, the oxidant may comprise any suitable gas containing oxygen, such as air, oxygen-rich air, substantially pure oxygen, or combinations thereof. In one or more embodiments herein, the first combustion chamber 110 operates at a pressure approximately the same as the discharge pressure of the first compressor 118. In one or more embodiments, the first compressor 118, the first combustion chamber 110, and the first expander 106, taken together, can be characterized as an open Brayton cycle.

A discharge exhaust stream 116 is generated as a product of combustion of the first fuel stream 112 and the compressed oxidant 114 and directed to the inlet of the first expander 106. In at least one embodiment, the first fuel stream 112 can be primarily natural gas, thereby generating a discharge 116 including volumetric portions of vaporized water, $CO_2$, CO, oxygen, nitrogen, nitrogen oxides ($NO_x$), and sulfur oxides ($SO_x$). In some embodiments, a small portion of unburned fuel 112 or other compounds may also be present in the discharge 116 due to combustion equilibrium limitations. As the discharge stream 116 expands through the expander 106, it generates mechanical power to drive the first compressor 118 or other facilities, and also produces a gaseous exhaust stream 122. In one or more embodiments, the first expander 106 accepts the discharge stream 116 at a temperature and pressure substantially equivalent to the first combustion chamber outlet temperature and pressure, and outputs the same gases at a temperature and pressure that are reduced but still elevated from ambient conditions.

The system 100 can also include a $CO_2$ separation system. In one or more embodiments, the gaseous exhaust stream 122 is directed to a $CO_2$ separator 140. The $CO_2$ separator 140 may employ any of a variety of separation processes designed to separate the gaseous exhaust stream 122 into a rich $CO_2$ stream 142 and a lean $CO_2$ stream 144. For example, the separator 140 may be designed to separate the gaseous exhaust stream using a chemical separation process, such as hot potassium carbonate ("hot pot") separation, amine separation, or separation using a solvent such as a glycol. Other separation processes include physical separation using membranes, or processes such as adsorptive kinetic separation or controlled freeze zone separation. In some embodiments, combinations of the foregoing separation methods may be used. The rich $CO_2$ stream 142 may be used for a variety of downstream applications, such as injection into a hydrocarbon reservoir for enhanced oil recovery (EOR), carbon sequestration, storage, sale, or recycle to the first combustion chamber 110 for use as a diluent to facilitate combustion of the compressed oxidant 114 and the first fuel 112 and increase the $CO_2$ concentration in the discharge exhaust stream 116. The rich $CO_2$ stream 142 may also be vented or flared. In one or more embodiments, the $CO_2$ separation process may be configured to maximize the temperature or the pressure of the lean $CO_2$ stream 144.

In one or more embodiments, the lean $CO_2$ stream 144 may optionally be used for additional power generation. For example, lean $CO_2$ stream 144 may be heated in a heat exchanger 150 configured to transfer heat from the gaseous exhaust stream 122 to the lean $CO_2$ stream 144. Upon exiting the heat exchanger 150, the lean $CO_2$ stream 144 may then be directed to a second combustion chamber 130 configured to combust a second fuel stream 132 to add additional heat to the lean $CO_2$ stream 144. The second fuel stream may have the same composition as the first fuel stream 112, or may have a different composition. For example, the second fuel stream 132 may primarily comprise hydrogen. In one or more embodiments, the operating pressure of the second combustion chamber 130 is lower than that of the first combustion chamber 110.

From the second combustion chamber 130, the reheated lean $CO_2$ stream 162 is directed to a second expander 160. The second expander 160 generally operates at a lower pressure than that of the first expander 106. For example, in one or more embodiments the second expander accepts the reheated lean $CO_2$ stream 162 from the $CO_2$ separation process at a pressure higher than ambient and outputs the same gases at approximately ambient pressure via expanded lean $CO_2$ stream 164. The power generated by the second expander 160 may be used for a variety of purposes, such as to at least partially drive the first compressor 118 or one or more additional compressors (not shown) or to drive an electric generator. In some embodiments, when either the rich $CO_2$ or the lean $CO_2$ is injected into a reservoir for storage or EOR, the second expander 160 may be used to drive a pipeline or injection compressor.

In one or more embodiments, the expanded lean $CO_2$ stream 164 may be directed to a heat recovery steam generator (HRSG) 170 configured to use the residual heat in the expanded lean $CO_2$ stream 164 to generate steam 174. The steam 174 may have a variety of uses, such as for example to generate additional power by driving a steam turbine generator in a Rankine cycle or for water desalination. The cooled lean $CO_2$ stream 172 exiting the HRSG 170, like the rich $CO_2$ stream 142, may also be used for a variety of applications, including EOR, storage, sale, venting, or flaring.

Figure 2:
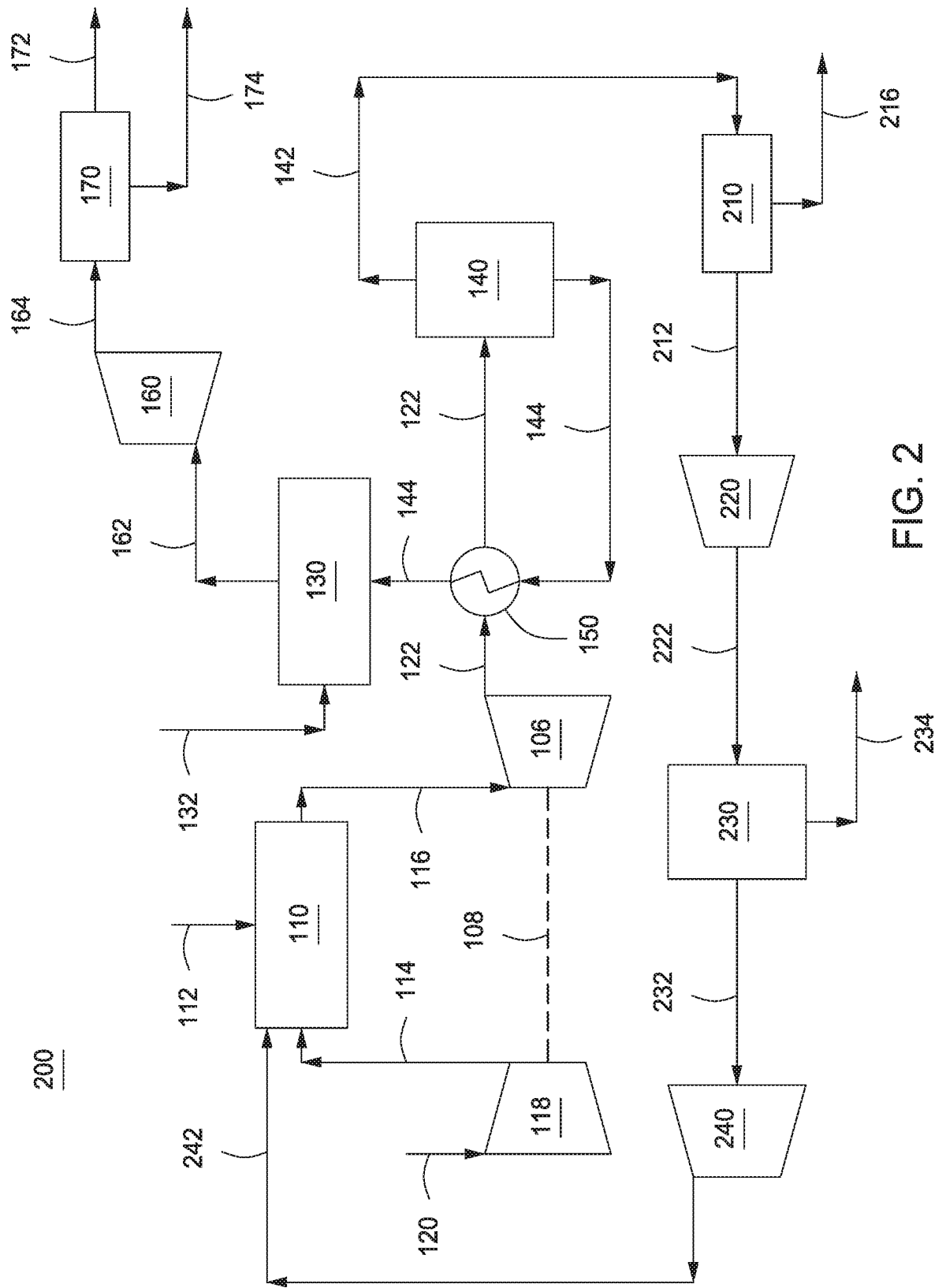
FIG. 2 depicts a low emission power generation system incorporating $CO_2$ separation and recycle of the rich $CO_2$ stream.

Referring now to FIG. 2, depicted is an alternative configuration of the power generation system 100 of FIG. 1, embodied and described as system 200. As such, FIG. 2 may be best understood with reference to FIG. 1. In system 200 of FIG. 2, at least a portion of the rich $CO_2$ stream 142 is recycled to the combustion chamber to achieve a higher concentration of $CO_2$ in the working fluid of the power generation system, thereby allowing for more effective $CO_2$ separation for subsequent sequestration, pressure maintenance, or EOR applications. To accomplish this, the first combustion chamber 110 is adapted to stoichiometrically combust the incoming mixture of first fuel 112 and compressed oxidant 114. In order to moderate the temperature of the combustion to meet first expander 106 inlet temperature and component cooling requirements, a portion of the rich $CO_2$ stream can be injected into the first combustion chamber 110 as a diluent. Thus, embodiments of the disclosure can essentially eliminate any excess oxygen from the working fluid while simultaneously increasing its $CO_2$ composition.

While the recycle loop illustrated in FIG. 2 incorporates various apparatus, the illustrated configuration is representative only and any system that recirculates the rich $CO_2$ stream 142 back to the first combustion chamber 110 to accomplish the goals stated herein may be used. In one or more embodiments, the rich $CO_2$ stream 142 can be sent to a second HRSG 210 in order to generate a stream of steam 216 and a cooled rich $CO_2$ gas 212. The steam 216 can optionally be sent to a steam gas turbine (not shown) to generate additional electrical power. In such configurations, the combination of the second HRSG 210 and the steam gas turbine can be characterized as a closed Rankine cycle.

In one or more embodiments, the cooled rich $CO_2$ gas 212 exiting the second HRSG 210 may be sent to at least one cooling unit 230 configured to reduce the temperature of the cooled rich $CO_2$ gas 212 and generate a cooled recycle $CO_2$ stream 232. In one or more embodiments, the cooling unit 230 is considered herein to be a direct contact cooler (DCC), but may be any suitable cooling device such as a direct contact cooler, trim cooler, a mechanical refrigeration unit, or combinations thereof. The cooling unit 230 can also be configured to remove a portion of condensed water via a water dropout stream 234. In one or more embodiments, the cooled rich $CO_2$ gas 212 can be directed to a blower or boost compressor 220 fluidly coupled to the cooling unit 230. In such embodiments, compressed cooled rich $CO_2$ stream 212 exits the blower 220 and is directed to the cooling unit 230.

Further, although the recycle loop shown in system 200 of FIG. 2 demonstrates 100% recycle of $CO_2$, it may be desirable in some circumstances to recycle only a portion of the $CO_2$ in the recycle loop to the combustion chamber 110. In such cases, one or more extraction streams (not shown) may be added to divert a portion of $CO_2$ from the recycle loop while the remainder of the $CO_2$ is recycled as described herein. The extracted portion of $CO_2$ may be withdrawn from the recycle loop via an extraction stream at a number of locations (not shown), such as from stream 212, 222, 232, or 242. The extracted $CO_2$ may be used for a variety of purposes, such as for EOR, sequestration, storage, sale, or venting.

The blower 220 can be configured to increase the pressure of the cooled rich $CO_2$ gas 212 before it is introduced into a recycle compressor 240. In one or more embodiments, the blower 220 increases the overall density of the cooled rich $CO_2$ gas 212, thereby directing an increased mass flow rate for the same volumetric flow to the recycle compressor 240. Because the recycle compressor 240 is typically volume-flow limited, directing more mass flow through the recycle compressor 240 can result in a higher discharge pressure from the recycle compressor 240, thereby translating into a higher pressure ratio across the first expander 106. A higher pressure ratio generated across the first expander 106 can allow for higher inlet temperatures and, therefore, an increase in first expander 106 power and efficiency. This can prove advantageous since the $CO_2$-rich discharge 116 generally maintains a higher specific heat capacity. Accordingly, the cooling unit 230 and the blower 220, when incorporated, may each be adapted to optimize or improve the operation of the power generation system 200.

The recycle compressor 240 can be configured to compress the cooled recycle $CO_2$ stream 232 to a pressure nominally above the first combustion chamber 110 pressure, thereby generating the compressed rich $CO_2$ recycle stream 242. In at least one embodiment, a purge stream (not shown) can be tapped from the rich $CO_2$ recycle stream 242 and optionally treated in an additional $CO_2$ separator (such as one similar to $CO_2$ separator 140) or other apparatus (not shown) to capture $CO_2$. The separated $CO_2$ can be used for sales, used in another process requiring carbon dioxide, and/or compressed and injected into a terrestrial reservoir for enhanced oil recovery (EOR), sequestration, or another purpose.

In some embodiments not depicted herein, high pressure steam may also be employed as a coolant in the combustion process, either in place of or in addition to the recycled rich $CO_2$ stream. In such embodiments, the addition of steam would reduce power and size requirements in the recycle loop (or eliminate the recycle loop altogether), but would require the addition of a water recycle loop.

Additionally, in further embodiments not depicted herein, the compressed oxidant feed to the combustion chamber may comprise argon. For example, the oxidant may comprise from about 0.1 to about 5.0 vol % argon, or from about 1.0 to about 4.5 vol % argon, or from about 2.0 to about 4.0 vol % argon, or from about 2.5 to about 3.5 vol % argon, or about 3.0 vol % argon. As will be appreciated by those skilled in the art, incorporating argon into the compressed oxidant feed may require the addition of a cross exchanger or similar device between the main compressor and the combustion chamber configured to remove excess $CO_2$ from the recycle stream and return argon to the combustion chamber at the appropriate temperature for combustion.

Figure 3:
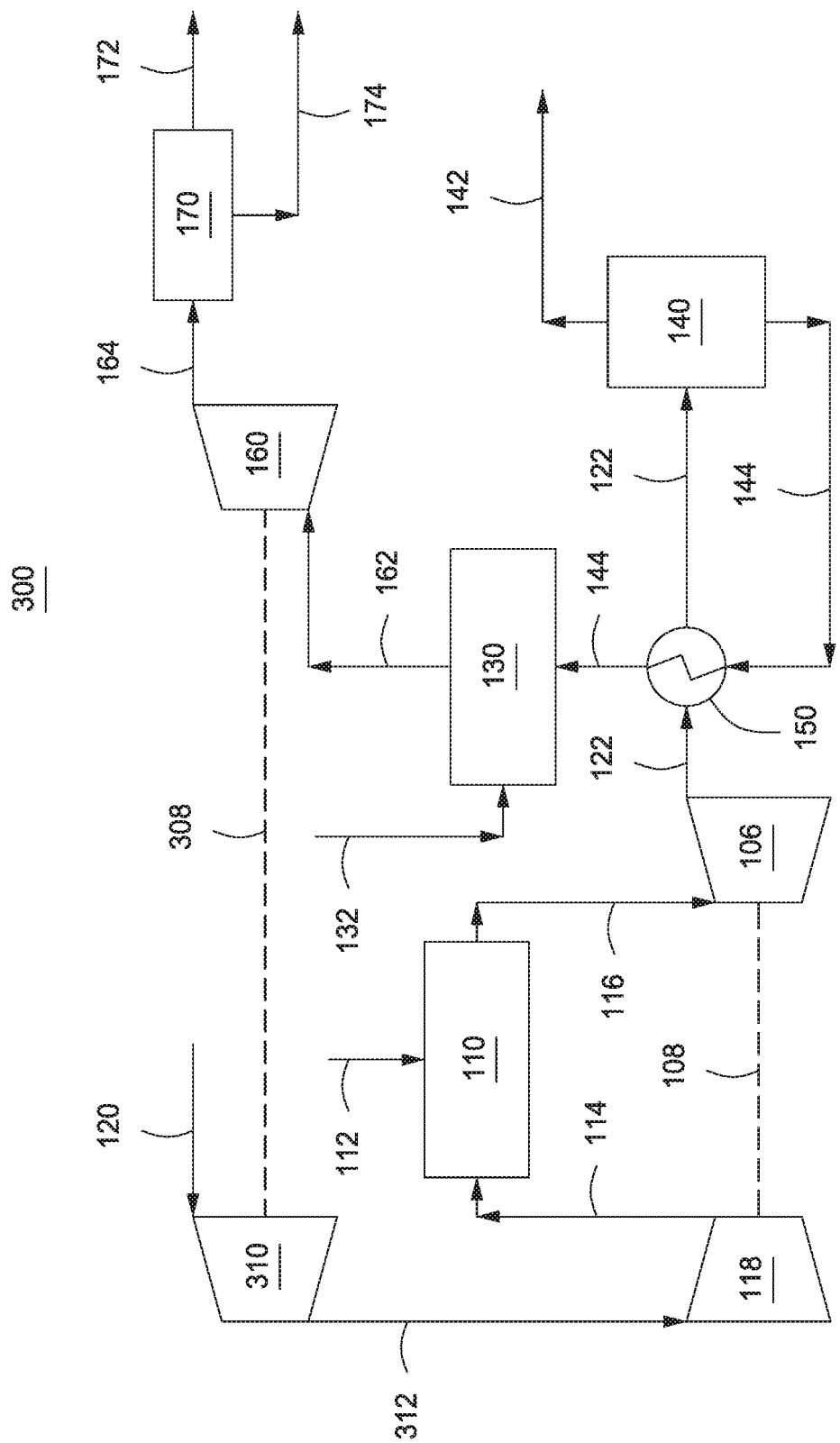
FIG. 3 depicts a low emission power generation system incorporating $CO_2$ separation and a second inlet compressor.

Referring now to FIG. 3, depicted is an alternative configuration of the power generation system 100 of FIG. 1, embodied and described as system 300. As such, FIG. 3 may be best understood with reference to FIG. 1. In system 300 of FIG. 3, a second compressor 310 is incorporated to provide additional initial compression of the feed oxidant 120. The second compressor 310 may be coupled to the second expander 160 through a common shaft 308 or other mechanical, electrical, or other power coupling, thereby allowing a portion of the mechanical energy generated by the second expander 160 to drive the second compressor 310. Pressurized oxidant stream 312 exits the second compressor and is directed to the first compressor 118, which in turn further compresses the oxidant and generates compressed oxidant 114 and directs compressed oxidant 114 to the first combustion chamber.

Figure 4:
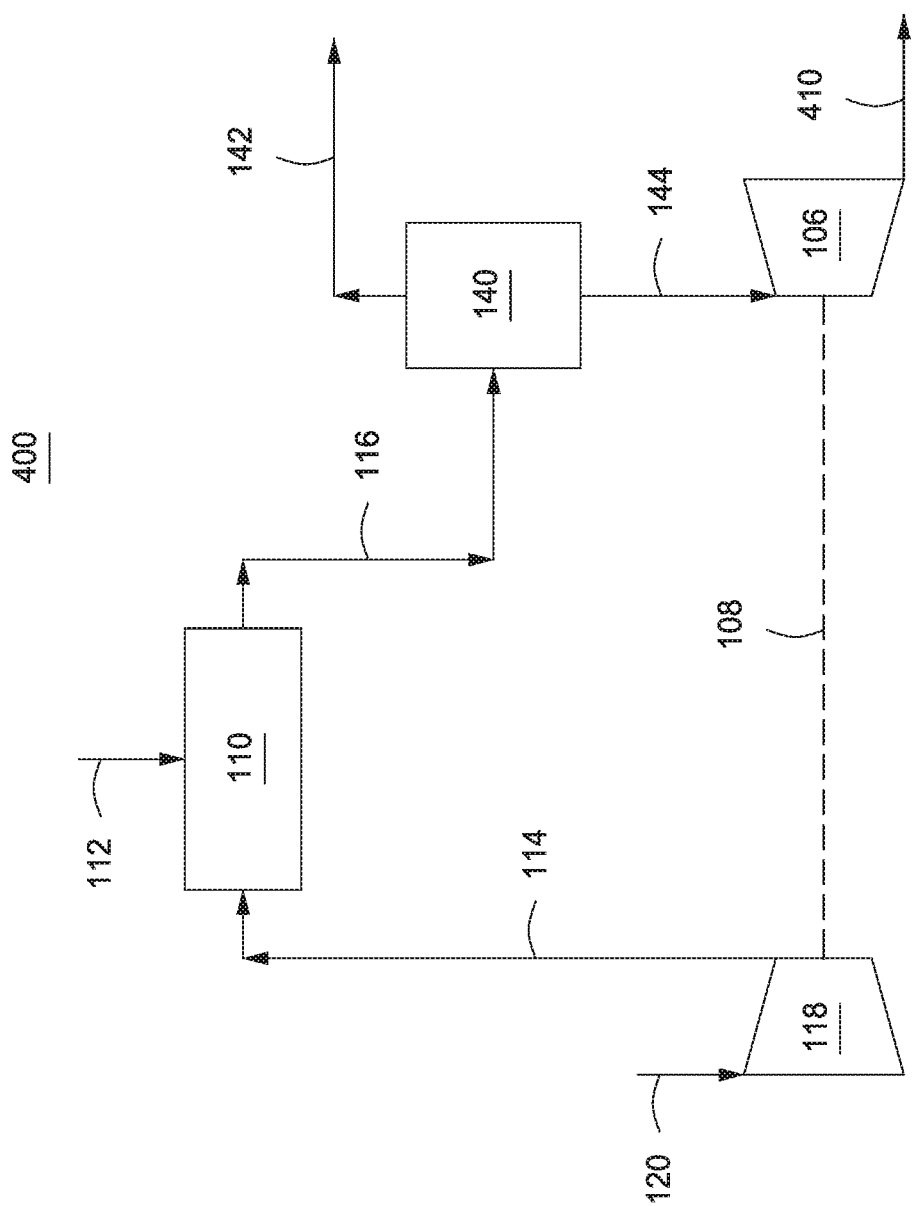
FIG. 4 depicts a low emission power generation system incorporating $CO_2$ separation upstream of the expander.

Referring now to FIG. 4, depicted is a simplified alternative configuration of the power generation system 100 of FIG. 1, embodied and described as system 400. As such, FIG. 4 may be best understood with reference to FIG. 1. In system 400 of FIG. 4, the $CO_2$ separation process is located upstream of the first expander 106. Accordingly, discharge exhaust stream 116 exits the first combustion chamber 110 and is supplied directly to the separator 140. As described above, the separator 140 separates the discharge exhaust stream 116 into a rich $CO_2$ stream 142 and a lean $CO_2$ stream 144. The rich $CO_2$ stream 142 may be further processed, recycled, or used as described in more detail above. The lean $CO_2$ stream is expanded in the first expander 106, and the resulting lean $CO_2$ discharge stream 410 may also be further processed or used as described in more detail above. For example, the lean $CO_2$ discharge stream 410 may be reheated in a second combustor and expanded again to generate additional power (not shown).

While the present disclosure may be susceptible to various modifications and alternative forms, the exemplary embodiments discussed above have been shown only by way of example. Any features or configurations of any embodiment described herein may be combined with any other embodiment or with multiple other embodiments (to the extent feasible) and all such combinations are intended to be within the scope of the present invention. Additionally, it should be understood that the disclosure is not intended to be limited to the particular embodiments disclosed herein. Indeed, the present disclosure includes all alternatives, modifications, and equivalents falling within the true spirit and scope of the appended claims.

What is claimed is:

1. A power generation system comprising:
a first compressor configured to receive and compress one or more oxidants to generate a compressed oxidant;
a first combustion chamber configured to receive and combust the compressed oxidant and a first fuel to generate an exhaust stream;
a first expander configured to receive the exhaust stream from the first combustion chamber and generate a gaseous exhaust stream;
a separator configured to receive and separate the gaseous exhaust stream into a $CO_2$ rich stream and a $CO_2$ lean stream; and a second combustion chamber configured to receive the $CO_2$ lean stream, and to combust a second fuel only in the presence of the $CO_2$ lean stream to generate a reheated $CO_2$ lean stream;

wherein the system is configured to recycle at east a portion of the $CO_2$ rich stream to the first combustion chamber.

2. The system of claim 1, further comprising a second expander configured to receive and expand the reheated $CO_2$ lean stream.

3. The system of claim 2, wherein an operating pressure of the first expander is higher than the operating pressure of the second expander.

4. The system of claim 2, further comprising a heat recovery steam generator configured to use heat from the reheated $CO_2$ can stream exiting the second expander to generate steam.

5. The system of claim 1, wherein the first expander at least partially drives the first compressor.

6. The system of claim 1, wherein the first fuel comprises natural gas, oil, coke, coal, hydrogen, bitumen, or a combination thereof.

7. The system of claim 1, wherein the one or more oxidants comprises air, oxygen-enriched air, oxygen, or a combination thereof.

8. The system of claim 1, wherein the separator uses a separation process selected from hot potassium carbonate separation, molecular sieve separation, amine separation, membrane separation, adsorptive kinetic separation, controlled freeze zone separation, or combinations thereof.

9. The system of claim 1, wherein the second fuel comprises hydrogen.

10. The system of claim 1, further comprising a heat recovery steam generator configured to use heat from the $CO_2$ rich stream exiting the separator to generate steam.

11. The system of claim 1, wherein the first combustion chamber is further configured to receive high pressure steam.

12. A method for generating power comprising:
compressing one or more oxidants in a first compressor to generate a compressed oxidant;
supplying the compressed oxidant and a first fuel to a first combustion chamber;
combusting the compressed oxidant and the first fuel in the first combustion chamber to generate an exhaust stream;
expanding the exhaust stream from the first combustion chamber in a first expander to generate a gaseous exhaust stream;
separating the gaseous exhaust stream into a $CO_2$ rich stream and a $CO_2$ lean stream using a separator;
combusting a second fuel only in the presence of the $CO_2$ lean stream in a second combustion chamber to generate a reheated $CO_2$ lean stream; and
recycling at least a portion of the $CO_2$ rich stream to the first combustion chamber.

13. The method of claim 12, further comprising expanding the reheated $CO_2$ lean stream in a second expander.

14. The method of claim 13, further comprising operating the first expander at a pressure higher than that of the second expander.

15. The method of claim 13, further comprising generating steam in a heat recovery steam generator using heat from the reheated $CO_2$ lean stream.

16. The method of claim 12, wherein the first fuel comprises natural gas, oil, coke, coal, other hydrocarbons, hydrogen, or a combination thereof.

17. The method of claim 12, wherein the oxidant comprises air, oxygen-enriched air, oxygen, or a combination thereof.

18. The method of claim 12, wherein the gaseous exhaust stream is separated using a process selected from hot potassium carbonate separation, amine separation, molecular sieve separation, membrane separation, adsorptive kinetic separation, controlled freeze zone separation, or combinations thereof.

19. The method of claim 12, further comprising heating the $CO_2$ lean stream before combusting the second fuel in the presence of the $CO_2$ lean stream.

20. The method of claim 19, wherein the $CO_2$ lean stream is heated in a heat exchanger.

21. The method of claim 12, wherein the second fuel comprises hydrogen.

22. The method of claim 12, further comprising generating steam in a heat recovery steam generator using heat from the $CO_2$ rich stream.

23. The method of claim 12, further comprising injecting the $CO_2$ rich stream into a hydrocarbon reservoir.

24. The method of claim 12, further comprising injecting the reheated $CO_2$ lean stream into a hydrocarbon reservoir.

25. The method of claim 12, further comprising supplying high pressure steam to the first combustion chamber.

* * * * *